United States Patent [19]

Kawasaki et al.

[11] Patent Number: 4,734,489

[45] Date of Patent: Mar. 29, 1988

[54] TRISAZO COMPOUNDS USEFUL IN PRODUCING WATER-RESISTANT INK COMPOSITIONS

[75] Inventors: Shinjiro Kawasaki, Nishinomiya; Hideo Kitagawa, Kyoto; Yutaka Nishii, Moriguchi; Hideo Kawashita, Ibaraki; Minoru Akagi, Toyonaka, all of Japan

[73] Assignees: Taoka Chemical Company, Limited; Sumitomo Chemical Company, Limited, both of Osaka, Japan

[21] Appl. No.: 844,589

[22] Filed: Mar. 27, 1986

[30] Foreign Application Priority Data

Mar. 29, 1985 [JP] Japan .................................. 60-68260
Dec. 16, 1985 [JP] Japan .................................. 60-283255

[51] Int. Cl.$^4$ ...................... C09B 31/18; C09B 33/22; C09B 35/46; C09D 11/18
[52] U.S. Cl. .......................................... 534/649; 106/22; 106/23; 106/288 Q; 534/582; 534/600; 534/680; 534/810; 534/815
[58] Field of Search ............... 534/649, 680, 810, 815; 106/23, 22

[56] References Cited

U.S. PATENT DOCUMENTS

| | | | |
|---|---|---|---|
| 858,444 | 7/1907 | Dressel et al. | 534/680 |
| 3,917,887 | 11/1975 | Stiller | 534/810 X |
| 4,097,476 | 6/1978 | Wicki | 534/810 X |
| 4,255,327 | 3/1981 | Brode | 534/680 |
| 4,468,348 | 8/1984 | Wicki | 534/680 X |
| 4,592,756 | 6/1986 | Kawasaki et al. | 534/680 X |

FOREIGN PATENT DOCUMENTS

| | | | |
|---|---|---|---|
| 0014378 | 8/1980 | European Pat. Off. | 534/680 |
| 2123688 | 11/1972 | Fed. Rep. of Germany | 534/680 |
| 2363603 | 6/1974 | Fed. Rep. of Germany | 534/680 |
| 2274661 | 1/1976 | France | 534/680 |
| 2286815 | 4/1976 | France | 534/680 |
| 49-39619 | 4/1974 | Japan | 534/680 |
| 0577542 | 7/1976 | Switzerland | 534/680 |
| 685078 | 7/1951 | United Kingdom | 534/680 |
| 1467415 | 3/1977 | United Kingdom | 534/680 |

Primary Examiner—Floyd D. Higel
Attorney, Agent, or Firm—Wegner & Bretschneider

[57] ABSTRACT

An azo compound of the formula:

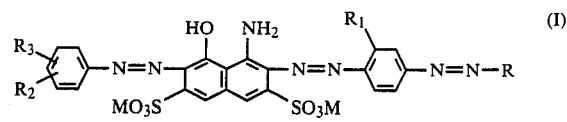

wherein R is of the formula:

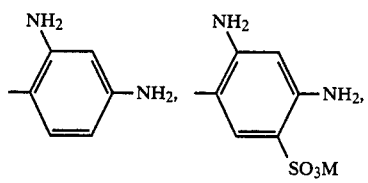

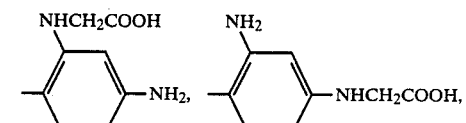

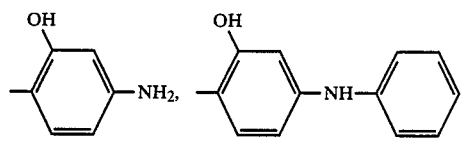

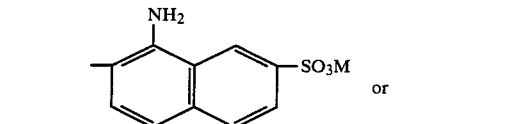

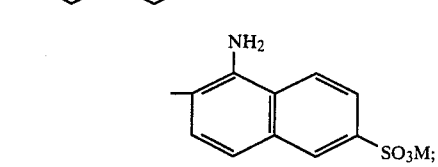

$R_1$ is hydrogen, methyl or —$SO_3M$; $R_2$ is hydrogen or —$SO_3M$; $R_2$ is hydrogen or —$SO_3M$; $R_3$ is $C_4$-$C_{18}$ alkyl and M is hydrogen, an alkali metal, ammonium or organic ammonium, provided that when R includes —$SO_3M$, $R_1$ and $R_2$ are not —$SO_3M$, and when R does not include —$SO_3M$, either one of $R_1$ and $R_2$ is —$SO_3M$, which is useful as a black dyestuff for a solvent type ink composition, particularly for ink jet recording.

13 Claims, No Drawings

TRISAZO COMPOUNDS USEFUL IN PRODUCING WATER-RESISTANT INK COMPOSITIONS

FIELD OF THE INVENTION

The present invention relates to an azo compound and a solution type composition comprising the same suitable for printing, writing, recording and stamping, particularly for ink jet printing.

BACKGROUND OF THE INVENTION

A conventional aqueous ink composition comprising a water soluble dyestuff such as direct dye, acid dye and basic dye has various advantages such that, when it is written or printed on a sheet of paper, it does not blur, or causes little set-off, although the printed image has poor water resistance (cf. Japanese Patent Kokai Publication Nos. 77706/1978, 75465/1980, 2361/1981, 133377/1981, 133378/1981, 136861/1981, 139568/1981, 139570/1981 and 63368/1982). It is, therefore, highly desired to provide an aqueous composition which can produce an image with good water resistance when used as an ink composition for an aqueous fountain pen and an aqueous ball point pen.

To impart good water resistance to an aqueous ink composition, it is proposed to disperse a finely ground pigment in an aqueous resin emulsion, to suppress excessive water solubility of the direct or acid dye by adding as a counter ion a basic dye or a high molecular weight amino compound, or by linking or adding a group reactive with paper material or a water dispersible polymeric chain to the water soluble dye.

However, the ink composition containing the dispersed pigment particles has high viscosity and its writing characteristics are decreased by sedimentation of the particles. Other proposals are still unsatisfactory.

It has been tried by the present inventors to incorporate the reactive group or the water dispersible polymeric chain to C. I. Direct Black 154, which is widely used as a component of the aqueous ink composition and disclosed in Japanese Patent Kokai Publication (unexamined) No. 11973/1981 or its analogous dyestuffs. However, it is difficult to prepare C. I. Direct Black 154 with a stable composition so that it is very troublesome to control the quantitative relationship between said dyestuff and a reagent to be reacted. Further, said dyestuff contains undesirable impurities which would deteriorate writing characteristics and water resistance of the printed image. Thus, reproducibility of stability of the ink composition and water resistance of the printed image is hardly achieved. In addition, said dyestuff is of the tolidine type, which is known to be undesirable as a dyestuff.

SUMMARY OF THE INVENTION

One object of the present invention is to provide a novel azo compound which is useful as a black dyestuff suitable for use in an aqueous ink composition, particularly for ink jet recording and a ball point pen.

Another object of the present invention is to provide an aqueous ink composition comprising a black dyestuff which has good storage stability and low viscosity.

Further object of the present invention is to provide an aqueous ink composition comprising a dyestuff which provides an excellent black image having water and light resistances.

These and other objects are accomplished by an azo compound of the formula:

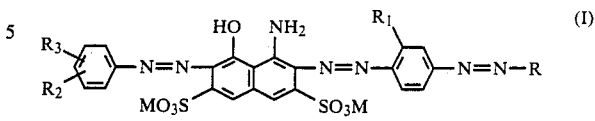

wherein R is of the formula:

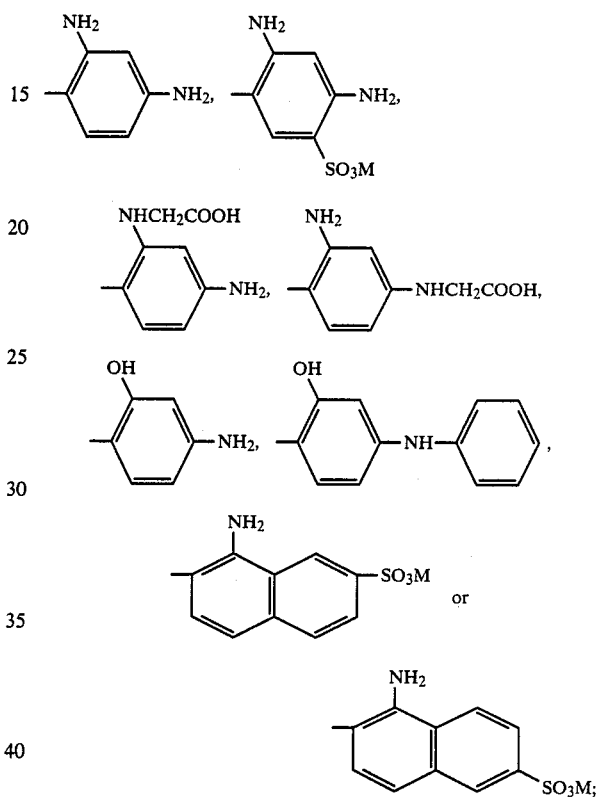

$R_1$ is hydrogen, methyl or $-SO_3M$; $R_2$ is hydrogen or: $-SO_3M$; $R_3$ is $C_4-C_{18}$ alkyl; and M is hydrogen, an alkali metal, ammonium or organic ammonium, provided that when the group R includes the: $-SO_3M$, the groups $R_1$ and $R_2$ are not the: $-SO_3M$, and when the group R does not include: $-SO_3M$, either one of the groups $R_1$ and $R_2$ is: $-SO_3M$, and a solution type composition comprising the azo compound (I), a hydrophilic solvent and water.

DETAILED DESCRIPTION OF THE INVENTION

Specific examples of the group $R_3$, namely a $C_4-C_{18}$ alkyl group, are n-butyl, t-butyl, n-hexyl, n-octyl, n-nonyl, n-dodecyl, iso-dodecyl and stearyl.

Specific examples of the alkali metal represented by M are sodium, lithium and potassium. As the organic ammonium group, exemplified are those corresponding to monoethanolamine, diethanolamine, triethanolamine and the like.

Some of the azo compounds (I) wherein $R_3$ is a hydrogen atom are described in GB Pat. No. 1,465,889, and the azo compound (I) of the invention can be prepared by the method described in said GB patent. For example, the azo compound (I) of the present invention may be prepared by reacting a disazo compound of the formula:

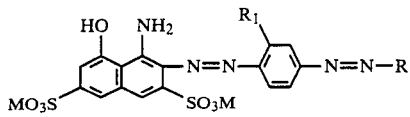
(II)

wherein R, $R_1$ and M are the same as defined above with a diazo compound of the formula:

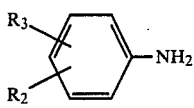
(III)

wherein $R_2$ and $R_3$ are the same as defined above, or reacting a diazotated compound of a disazo compound of the formula:

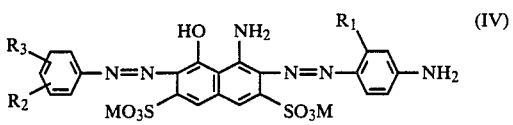
(IV)

wherein $R_1$, $R_2$, $R_3$ and M are the same as defined above with a coupling agent of the formula:

R—H wherein R is the same as defined above, namely a compound of the formula:

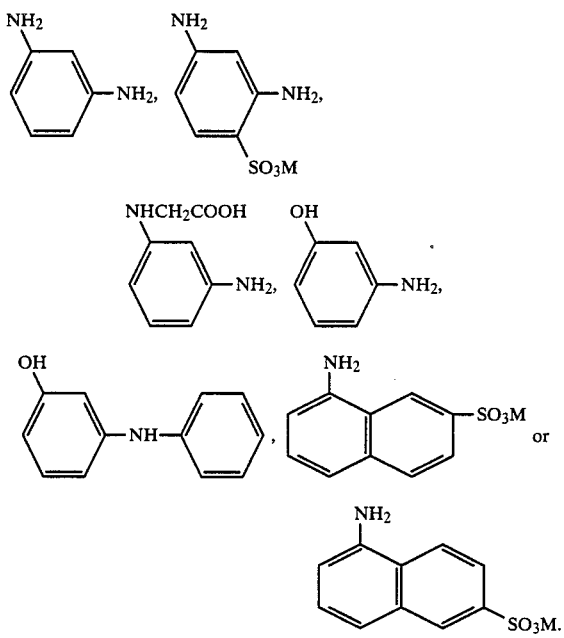

The solution type composition of the present invention may be prepared by a conventional method, for example, by dissolving the azo compound (I) in a mixture of water and a hydrophilic solvent (e.g. glycols, glycol monoalkyl ethers, isopropanol, dimethylsulfoxide, dimethylformamide and tetrahydrofuran). The composition may optionally contain a polyamino- or polyhydroxy-compound (e.g. urea, alkylurea, dextrin and alkylcellulose), a water soluble polymer (e.g. polyvinyl alcohol and polyvinyl pyrolidone), a surfactant, an inorganic salt (e.g. Glauber's salt), a foam inhibitor, a preservative, and the like.

In the ink composition of the invention, the amount of the azo compound (I) is usually from 0.5 to 20 parts by weight, preferably from 1 to 15 parts by weight per 100 parts by weight of the whole ink composition.

Usually, the azo compound (I) develops black color, and may be used alone or in combination. In addition, any dyestuff used in a conventional aqueous ink composition may be incorporated in the ink composition of the invention in such amount that the characteristic properties of the azo compound (I) are not deteriorated.

The hydrophilic solvent is used in an appropriate amount so as to impart the characteristic properties desired for a recording vehicle of the ink composition. Its amount may be preferably from 10 to 80 parts by weight per 100 parts by weight of the ink composition. Usually, one kind of the hydrophilic solvent is used, although two or more kinds of them may be used insofar as they do not adversely affect each other.

One of the characteristics of the azo compound (I) of the invention is that it has the long alkyl group having 4 to 18 carbon atoms, preferably 8 to 12 carbon atoms as the group $R_3$.

Hitherto, as an azo dye having a $C_{12}H_{25}$ group, for example, C. I. Acid Yellow 72 of the formula:

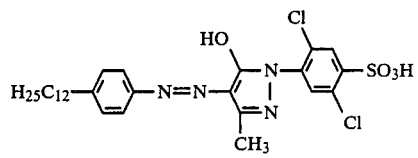

and C. I. Acid Red 138 of the formula:

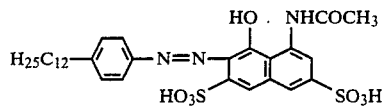

have been known as a so-called Milling type acid dyes which can dye wool and polyamide fibers to provide a dyed material having tough resistance to washing and a good build up property.

The azo compound (I) of the present invention has following advantages:

(1) It is dissolved in the hydrophilic solvent or a mixture of water and a hydrophilic solvent at a weakly alkaline pH range not higher than 9.

(2) The ink composition containing the azo compound (I) provides a written or printed image having excellent water resistance on a sheet of paper.

(3) Since the ink composition containing the azo compound (I) has good covering power, the concentration of the dyestuff can be low so that the ink composition has low viscosity and good stability.

The solvent type ink composition of the invention is suitable for coloring paper, writing and particularly for ink jet recording and an aqueous ball point pen.

The present invention will be hereinafter explained further in detail by following examples in which part(s) are by weight unless otherwise indicated.

EXAMPLE 1

In water (100 ml), 35% hydrochloric acid (29 g) and

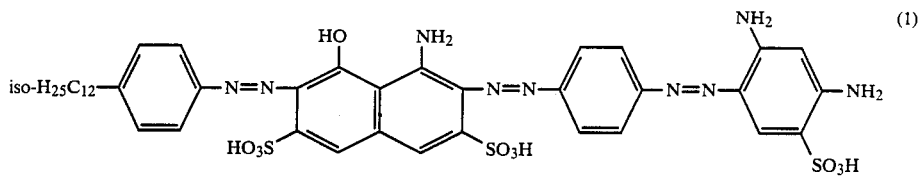

p-nitroaniline (13.8 g) were added and cooled to 3° C. with ice. Then, sodium nitrite (6.9 g) was added to commence diazotation. To the reaction mixture containing a diazo compound, a dispersion of H-acid (33 g) in water (1,000 ml) was added to commence a coupling reaction. After adjusting pH at 10 with sodium hydroxide, sodium sulfide (23 g) was added to reduce a nitro group. After pH of the mixture was adjusted at 4 to 5 with hydrochloric acid, the mixture was salted out with 10% by volume brine and filtered. The cake was dispersed in water (300 ml) and solubilized by the addition of a 47% sodium hydroxide solution. To the resulting solution, sodium nitrite (6.9 g) was added and poured into a mixture of ice-water (300 ml) and 35% hydrochloric acid (60 g) to commence diazotation followed by the addition of soda ash to adjust the pH to 5 to 6. To the mixture containing a diazo compound, a solution of 1,3-diaminobenzene-4-sulfonic acid (18.8 g) in water (100 ml) was added to commence a coupling reaction followed by the addition of soda ash to adjust pH at 9. To the mixture, a diazonium salt corresponding to p-iso-dodecylaniline (26.1 g) was added to commence a coupling reaction followed by the addition of soda ash to adjust pH at 9. After adding activated carbon (2 g), the mixture was heated at a temperature of 80° to 90° C. for 1 hour and filtered. pH of the filtrate was adjusted at 2 with hydrochloric acid, salted out with 15% by volume of brine and filtered. The cake was dried to give a black powdery compound (68 g) of the following formula.

A solution of the compound in ion-exchanged water had $\lambda_{max}$ at 625 nm and absorbance of 0.655 (10 mg/l).

EXAMPLE 2

In the same manner as in Example 1 but using p-n-dodecylaniline in place of p-iso-dodecylaniline, the reactions were carried out to give a black powdery compound (68 g) of the following formula.

A solution of the compound in ion-exchanged water had $\lambda_{max}$ at 625 nm and absorption of 0.656 (10 mg/l).

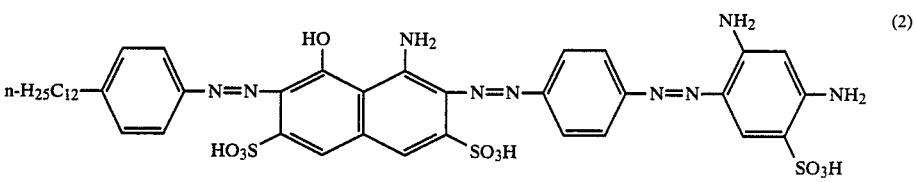

EXAMPLE 3

In the same manner as in Example 1 but using p-n-octylaniline in place of p-iso-dodecylaniline, the reactions were carried out to give a black powdery compound (58 g) of the following formula.

A solution of the compound in ion-exchanged water had $\lambda_{max}$ of 625 nm and absorbance of 0.759 (10 mg/l).

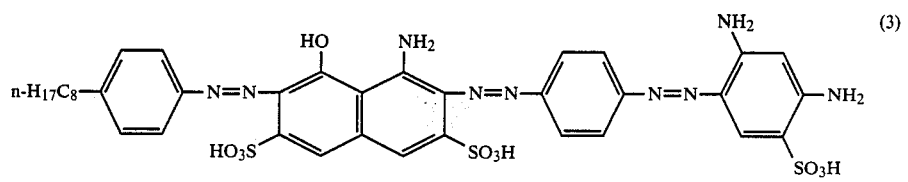

EXAMPLE 4

The black powdery compound prepared in Example 1 (68 g) was dissolved in a mixture of water (300 ml) and sodium hydroxide (8.4 g) and dried to give a black powdery compound (72 g) of the following formula.

A solution of the compound in ion-exchanged water had $\lambda_{max}$ at 625 nm and absorbance of 0.620 (10 mg/l).

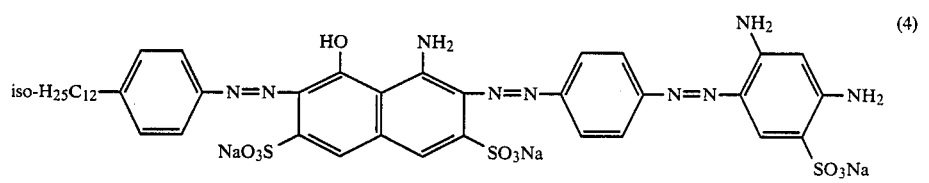

EXAMPLE 5

To a solution of the black powdery compound prepared in Example 2 in water (300 ml), triethanolamine (10 g) was added, heated at a temperature of 90° to 95° C. for 4 hours and dried to give a black powdery compound (76 g) of the following formula.

A solution of the compound in ion-exchanged water had $\lambda_{max}$ at 625 nm and absorbance of 0.587 (10 mg/l).

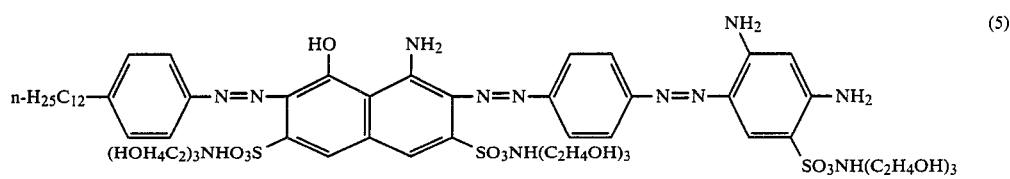
(5)

EXAMPLE 6

In the same manner as in Examples 1 to 5, azo compounds (6) to (11) were prepared as shown below:

Compound (6)

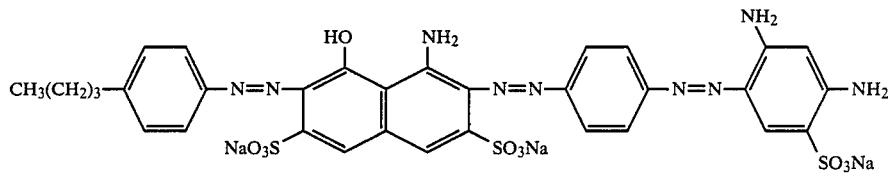

($\lambda_{max}$ at 625 nm, absorbance of 0.798 (10 mg/l))

Compound (7)

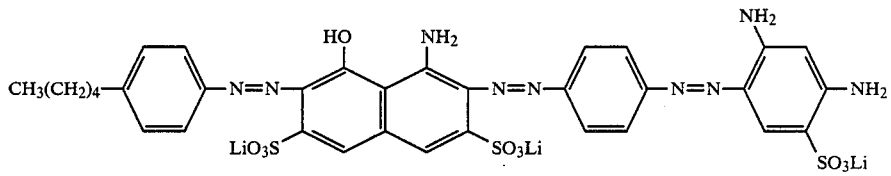

($\lambda_{max}$ at 625 nm, absorbance of 0.788 (10 mg/l))

Compound (8)

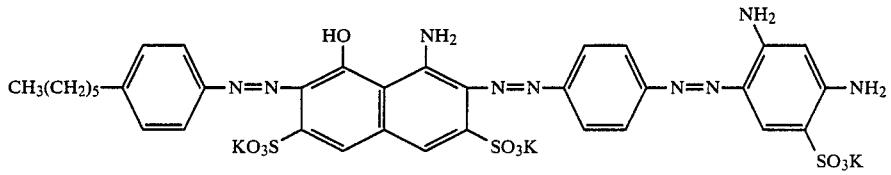

($\lambda_{max}$ at 625 nm, absorbance of 0.780 (10 mg/l))

Compound (9)

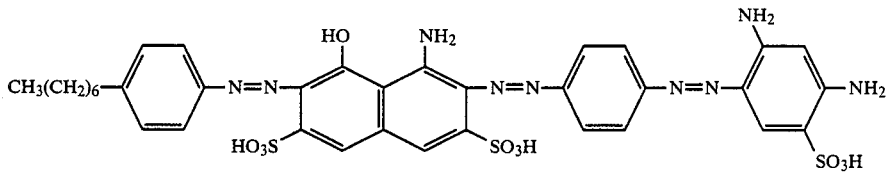

($\lambda_{max}$ at 625 nm, absorbance of 0.772 (10 mg/l))

Compound (10)

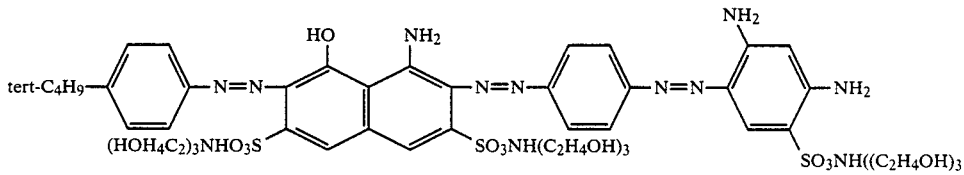

($\lambda_{max}$ at 625 nm, absorbance of 0.790 (10 mg/l))

Compound (11)

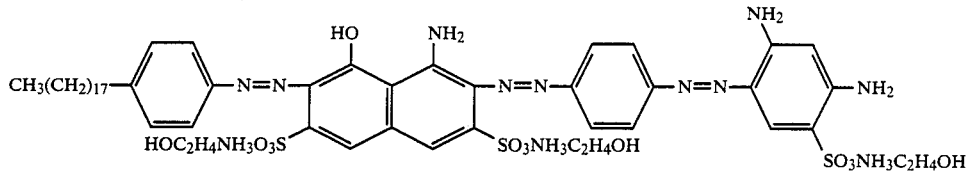

($\lambda_{max}$ at 625 nm, absorbance of 0.603 (10 mg/l)).

EXAMPLE 7

To a solution of a disazo compound (71 g) of the formula:

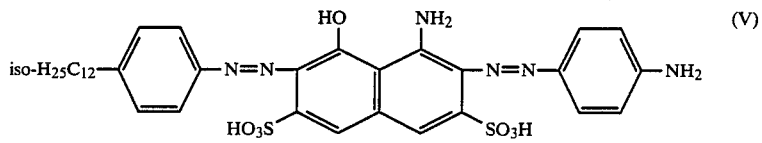

in water (700 ml) at pH 9 (adjusted with sodium hydroxide), sodium nitrite (7.5 g) was dissolved. The resulting solution was poured in ice-water (300 ml) containing 35% hydrochloric acid (40 g) and stirred for 3 hours to commence diazotation. After adjusting pH at 6 with sodium acetate, an alkaline aqueous solution (100 ml) containing 1,3-diaminobenzene-4-sulfonic acid (18 g) was added, stirred at pH of 8 for 4 hours and filtered. After purification by a conventional method, an azo compound (60 g) of the following formula (12) was obtained.

A solution of the compound (12) in ion-exchanged water had $\lambda_{max}$ at 625 nm and absorbance of 0.620 (10 mg/l).

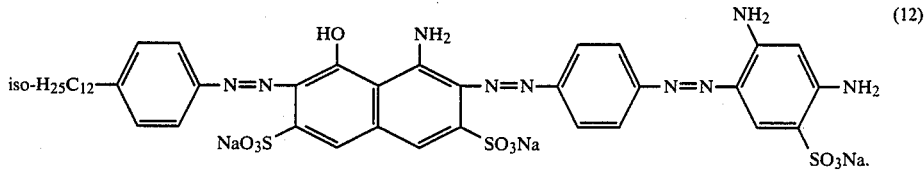

With this azo compound (12), an ink composition having the following composition was prepared:

| Component | Amount (g) |
| --- | --- |
| Compound (12) | 7 |
| Diethylene glycol | 30 |
| Plysurf A 212 E (surfactant) | 0.5 |
| Butyl p-hydroxybenzoate (preservative) | 0.1 |

| Component | Amount (g) |
| --- | --- |
| Water | 70 |

The ink composition was filled in a ball-point pen and an image was written on a sheet of paper with said pen. Then, the paper bearing the written image was immersed in water for 5 minutes, but no elution of the dyestuff was observed.

The ink composition was filled in a gas permeable bottle and stored for 6 months. pH of the composition dropped from 9.0 to 8.6 (by absorbing carbon dioxide in the air), but gel formation was not observed.

COMPARATIVE EXAMPLE 1

In the same manner as in Example 7 but using an azo compound (7 g) of the following formula:

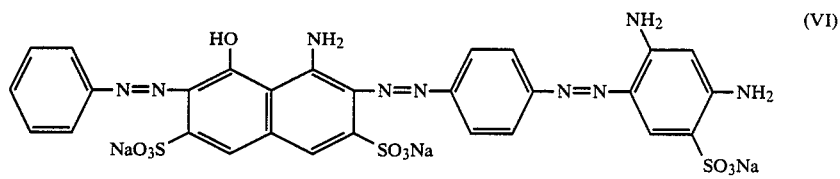

in place of the compound (12), an ink composition was prepared and filled in a ball-point pen.

After a sheet of paper bearing the written image of the ink composition was immersed in water for 5 minutes, the dyestuff was greatly eluted and the image disappeared.

COMPARATIVE EXAMPLE 2

In the same manner as in Example 7 but using a dyestuff (7 g) of the formula:

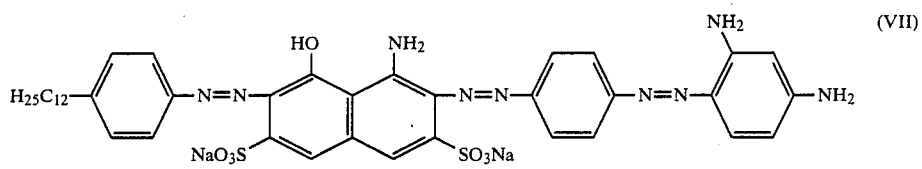

in place of the compound (12), an ink composition having pH of 9.5 was prepared and stored in a gas permeable bottle for about 6 months. pH of the composition decreased to 9.0 and gel formed.

EXAMPLE 8

A disazo compound (64 g) of the formula:

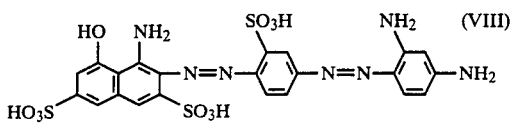

was dissolved in water (700 ml) with adjusting a pH at 9 with soda ash. To this solution, added was a neutral solution (pH 4) of p-iso-dodecylaniline (26 g) which had been diazotated in water (300 ml). After adjusting pH of the reaction mixture at 8 to 9 with soda ash, the mixture was stirred for 2 to 3 hours. The precipitated compound was filtered and purified by a conventional method to give an azo compound of the following formula (13).

A solution of the compound (13) in ion-exchanged water had $\lambda_{max}$ at 625 nm and absorbance of 0.623 (10 mg/l).

| Component | Amount (g) |
|---|---|
| Compound (13) | 7 |
| Diethylene glycol | 10 |
| Glycerol | 10 |
| Sodium pentachlorophenolate | 0.5 |
| Water | 80 |

The ink composition was filled in a ball-point pen and an image was written on a sheet of paper with said pen. Then, the paper bearing the written image was immersed in water for 5 minutes but no elution of the dyestuff was observed.

COMPARATIVE EXAMPLE 3

In the same manner as in Example 8 but using a dyestuff of the formula:

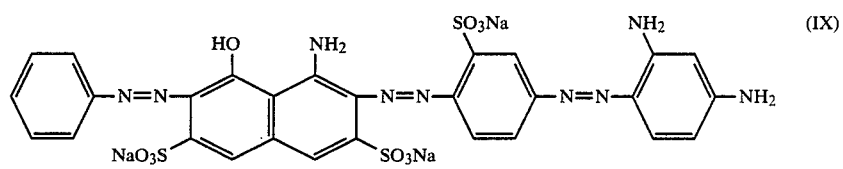

in place of the azo compound (13), an ink composition was prepared. After a sheet of paper bearing the written image of the ink composition was immersed in water for 5 minutes, the dyestuff was greatly eluted.

EXAMPLE 9

In the same manner as in Example 7 but using one of

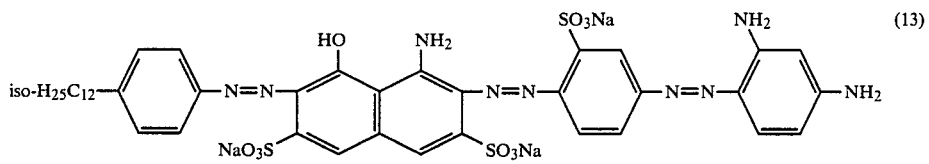

With this azo compound (13), an ink composition having the following composition was prepared:

the following dyestuffs (14) to (19), an ink composition was prepared. The ink composition was filled in a ball-point pen and an image was written on a sheet of paper with said pen. Then, the paper with the written image was immersed in water for 5 minutes. Further, hue of the written image was observed after 24 hours.

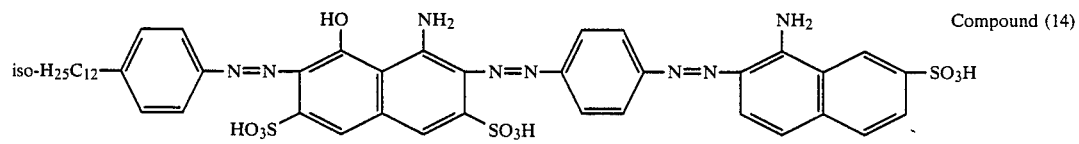

($\lambda_{max}$ at 605 nm; absorbance of 0.602 (10 mg/l); black; no elution)

-continued

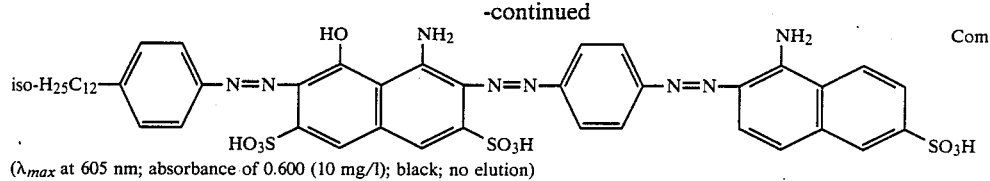
Compound (15)
($\lambda_{max}$ at 605 nm; absorbance of 0.600 (10 mg/l); black; no elution)

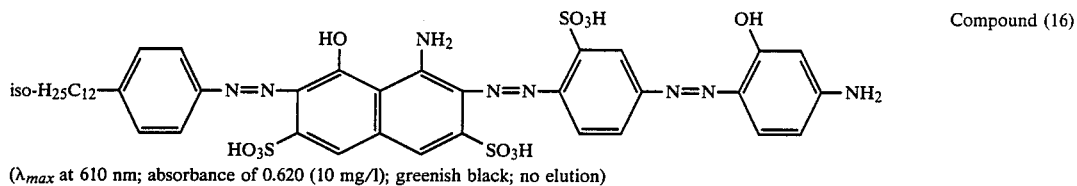
Compound (16)
($\lambda_{max}$ at 610 nm; absorbance of 0.620 (10 mg/l); greenish black; no elution)

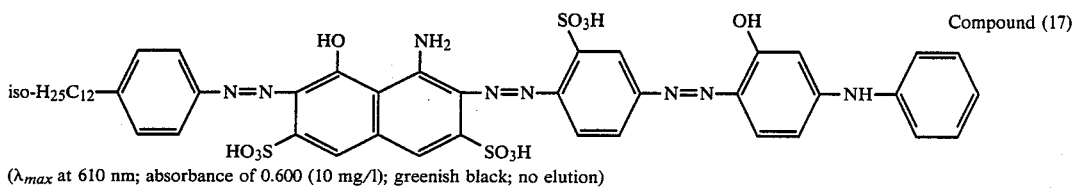
Compound (17)
($\lambda_{max}$ at 610 nm; absorbance of 0.600 (10 mg/l); greenish black; no elution)

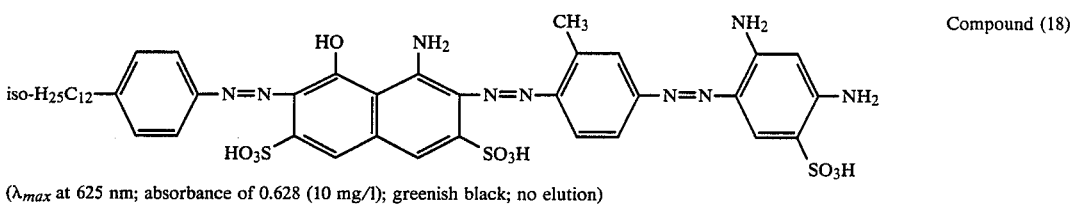
Compound (18)
($\lambda_{max}$ at 625 nm; absorbance of 0.628 (10 mg/l); greenish black; no elution)

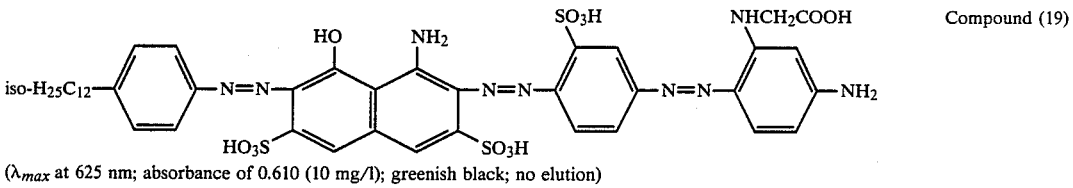
Compound (19)
($\lambda_{max}$ at 625 nm; absorbance of 0.610 (10 mg/l); greenish black; no elution)

EXAMPLE 10

To a slurry (800 ml) of an azo compound (79 g) of the formula:

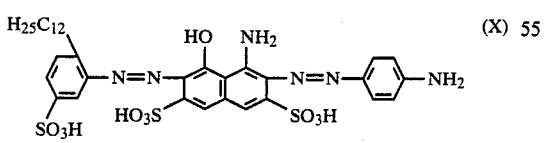
(X)

which had been diazotated in the same manner as in Example 7 and neutralized with sodium acetate at pH of 6, an aqueous solution (50 ml) containing meta-phenylenediamine (10 g) was added and stirred for 4 hours with adjusting pH at 7 to 8 with soda ash. The precipitated compound was filtered and purified by a conventional method to give an azo compound (70 g) of the following formula (20).

A solution of the compound in ion-exchanged water had $\lambda_{max}$ at 620 nm and absorbance of 0.618 (10 mg/l).

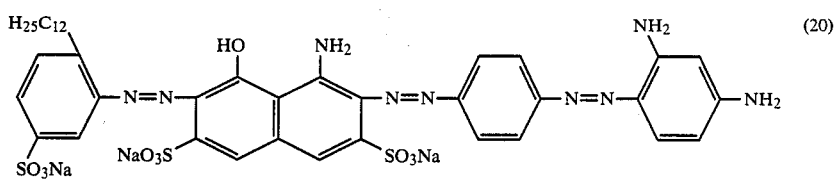
(20)

With this azo compound (20), an ink composition having following composition was prepared:

| Component | Amount (g) |
| --- | --- |
| Compound (20) | 7 |
| Diethylene glycol | 20 |
| Polyvinyl pyrolidone | 1 |
| Noygen P (surfactant) | 0.1 |
| Butyl p-hydroxybenzoate | 0.1 |
| Water | 80 |

The black ink composition was filled in a ballpoint pen and an image was written on a sheet of paper with said pen. Then, the paper bearing the written image was immersed in water for 5 minutes, but no elution of the dyestuff was observed.

COMPARATIVE EXAMPLE 4

In the same manner as in Example 10 but using a dyestuff (7 g) of the following formula:

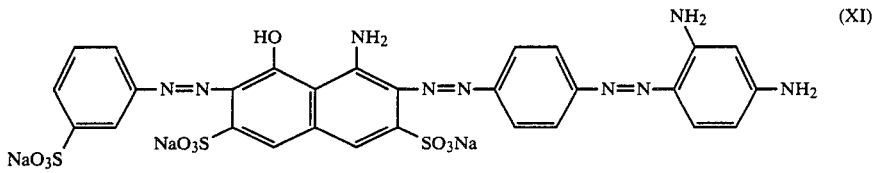

After a sheet of paper bearing the written image of the ink composition was immersed in water for 5 minutes, the dyestuff was greatly eluted.

EXAMPLE 11

In the same manner as in Example 10 but using a disazo compound (80 g) of the formula:

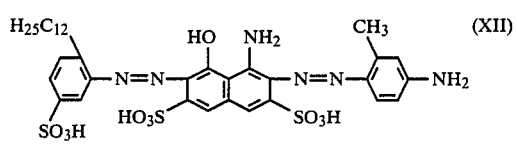

in place of the compound (X) and a compound (16 g) of the formula:

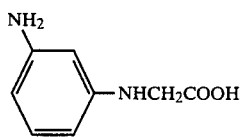

in place of meta-phenylenediamine, the reactions were carried out to give an azo compound (70 g) of the following formula (21).

A solution of the compound (21) in ion-exchanged water had $\lambda_{max}$ at 620 nm and absorbance of 0.608 (10 mg/l).

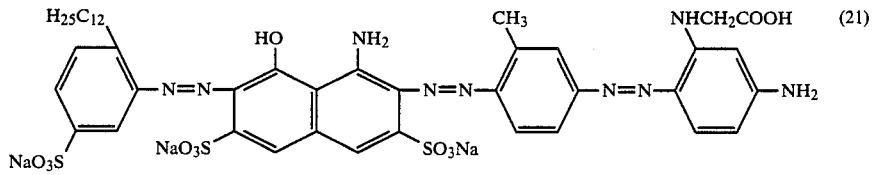

With this azo compound (21), an ink composition was prepared in the same manner as in Example 8. The ink composition was filled in a sign pen and an image was written on a sheet of paper with said pen. Then, the paper bearing the written image was immersed in water for 5 minutes, but no elution of the dyestuff was not observed.

EXAMPLE 12

To a solution of the azo compound (13) prepared in Example 8 (65 g) in water (1,000 ml), monochloroacetic acid (15 g) was added at a temperature of 70° to 80° C. followed by the treatment with soda ash at pH of 9 for about 2 hours. The product was recovered and purified by conventional methods to give an azo compound of the following formula (22).

A solution of the compound (22) in ion-exchanged water had $\lambda_{max}$ at 625 nm and absorbance of 0.615 (10 mg/l).

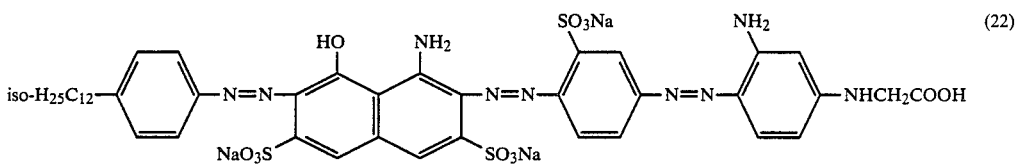

With the azo compound (22), an ink composition was prepared in the same manner as in Example 10 and filled in a sign pen. After a sheet of paper bearing the written image of the ink composition was immersed in water for 5 minutes, the dyestuff was not eluted.

EXAMPLE 13

With the azo compound (12) prepared in Example 7, an ink composition having the following composition was prepared:

| Component | Amount (g) |
| --- | --- |
| Compound (12) | 5 |
| Polyethylene glycol 200 | 15 |
| Glycerol | 5 |
| EDTA | 0.1 |
| Sodium dehydroacetate | 0.1 |
| Ion-exchanged water | 74.8 |

The components were thoroughly mixed at 50° C. and filtered under pressure through a membrane filter (0.5 micron) to prepared Ink Composition A.

With the azo compound (2) prepared in Example 2, an ink composition having the following composition was prepared:

| Component | Amount (g) |
| --- | --- |
| Compound (2) | 5 |

| Component | Amount (g) |
| --- | --- |
| Polyethylene glycol 200 | 15 |
| Butylcarbitol | 8 |
| Triethanolamine | 2 |
| EDTA | 0.1 |
| Sodium dehydroacetate | 0.1 |
| Ion-exchanged water | 69.8 |

The components were thoroughly mixed at 50° C. and filtered under pressure through a membrane filter (0.5 micron) to prepared Ink Composition B.

With the azo compound (1) prepared in Example 1, an ink composition having the following composition was prepared:

| Component | Amount (g) |
| --- | --- |
| Compound (1) | 5 |
| Polyethylene glycol 200 | 15 |
| Ethylene glycol | 3 |
| Triethanolamine | 2 |
| EDTA | 0.1 |
| Sodium dehydroacetate | 0.1 |
| Ion-exchanged water | 74.8 |

The components were thoroughly mixed at 50° C. and filtered under pressure through a membrane filter (0.5 micron) to prepared Ink Composition C.

With the azo compound (3) prepared in Example 3, an ink composition having the following composition was prepared:

| Component | Amount (g) |
| --- | --- |
| Compound (3) | 5 |
| Polyethylene glycol 200 | 15 |
| Ethylene glycol | 3 |
| Triethanolamine | 2 |
| EDTA | 0.1 |
| Sodium dehydroacetate | 0.1 |
| Ion-exchanged water | 74.8 |

The components were thoroughly mixed at 50° C. and filtered under pressure through a membrane filter (0.5 micron) to prepare Ink Composition D.

Ink Compositions A to D were examined for their storage stability, jet stability, image clarity and water resistance. The examinations were carried out as follows:

Storage stability

The ink composition was sealed in a Pyrex-made test tube and allowed to stand at 0° C. or 50° C. for one month. Thereafter, the presence of precipitation was observed. None of the ink compositions produced precipitation.

Jet stability

The ink composition was charged in an ink jet recording device provided with a nozzle of 30 microns in diameter and jetted for 24 hours, during which jetting was effected with cycles each consisting of one second jetting and one second rest. After the jetting was stopped, the ink composition was allowed to stand at room temperature for 10, 20, 30, 60 or 90 days and again subjected to jetting, at which observation was made on whether clogging was produced. All the ink compositions could be jetted again after 90 days.

Image clarity

The ink composition was jetted on a sheet of wood free paper for recording by the means of the same device as used for evaluating the jet stability, and the image clarity of the image recorded on the paper was visually observed. All the ink compositions had good image clarity.

Water resistance

An image was recorded on a sheet of wood free paper by means of the same device as used for evaluating the jet stability and immersed in water for one minute. Bleeding of the dye was not observed with any of the ink compositions.

From the above results, it is clearly seen that the ink composition of the invention has good storage stability, jet stability, image clarity and water resistance.

EXAMPLE 14

With the azo compound (3) prepared in Example 3, an ink composition having the following composition was prepared:

| Component | Amount (g) |
| --- | --- |
| Compound (3) | 7 |
| Diethylene glycol | 10 |
| Glycerol | 10 |
| Sodium pentachlorophenolate | 0.5 |
| Water | 80 |

The ink composition was filled in a ball-point pen and an image was written on a sheet of paper with said pen. Then, the paper bearing the recorded image was immersed in water for 5 minutes but no elution of the dyestuff was observed.

What is claimed is:

1. An azo compound of the formula:

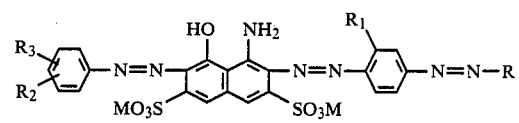

wherein R is of the formula:

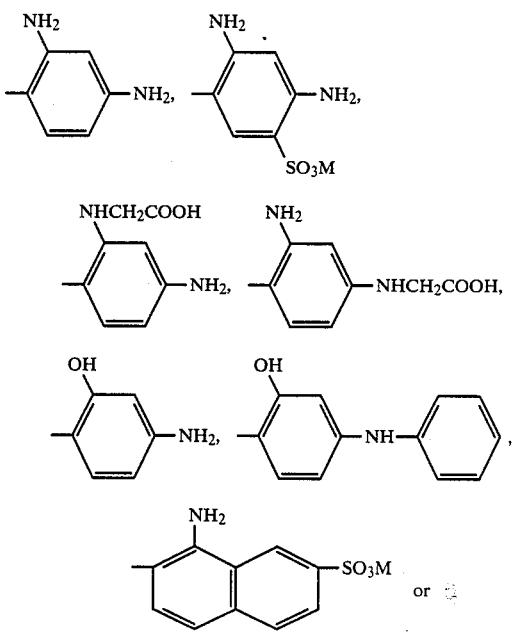

-continued

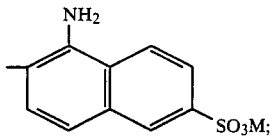

$R_1$ is hydrogen, methyl or —$SO_3M$; $R_2$ is hydrogen or —$SO_3M$; $R_3$ is $C_4$-$C_{18}$ alkyl and M is hydrogen, an alkali metal, ammonium, monoethanol ammonium, diethanol ammonium, or triethanol ammonium, provided that when R includes —$SO_3M$, $R_1$ and $R_2$ are not —$SO_3M$, and when R does not include —$SO_3M$, one of $R_1$ and $R_2$ is —$SO_3M$.

2. The azo compound according to claim 1, wherein R is of the formula:

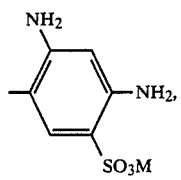

wherein M is the same as defined above.

3. The azo compound according to claim 1, wherein $R_3$ is n-octyl, n-nonyl, n-dodecyl or isododecyl.

4. The azo compound according to claim 2, wherein $R_3$ is n-octyl, n-nonyl, n-dodecyl or isododecyl.

5. The azo compound according to claim 1, wherein R is of the formula:

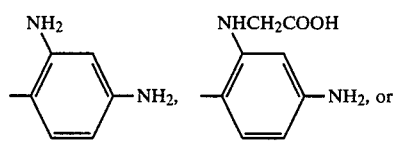

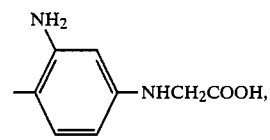

and $R_1$ is of the formula: —$SO_3M$ wherein M is the same as defined above.

6. The azo compound according to claim 1, wherein M is an alkali metal selected from the group consisting of sodium, potassium and lithium.

7. The azo compound according to claim 1, wherein M is hydrogen.

8. A solution type composition comprising an azo compound of the formula:

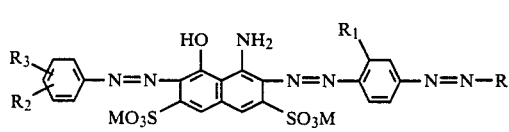

wherein R is of the formula:

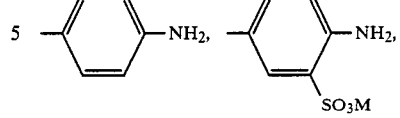

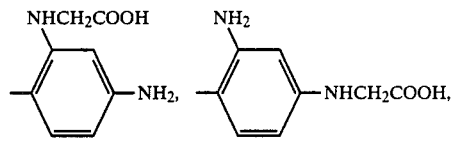

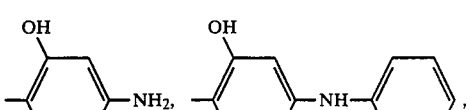

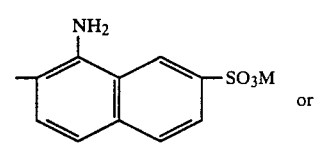

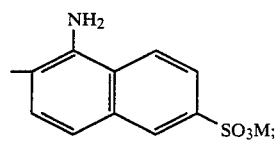

$R_1$ is hydrogen, methyl or —$SO_3M$; $R_2$ is hydrogen or —$SO_3M$; $R_3$ is $C_4$-$C_{18}$ alkyl and M is hydrogen, an alkali metal, ammonium, monoethanol ammonium, diethanol ammonium or triethanol ammonium, provided that when R includes —$SO_3M$, $R_1$ and $R_2$ are not —$SO_3M$, and when R does not include —$SO_3M$, one of $R_1$ and $R_2$ is —$SO_3M$; a hydrophilic solvent and water.

9. The solution type composition according to claim 8, wherein R is of the formula:

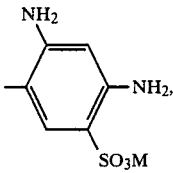

wherein M is the same as defined above, and $R_3$ is n-octyl, n-nonyl, n-dodecyl or isododecyl.

10. The solution type composition according to claim 8, wherein the amount of the azo compound is 1 to 15 parts by weight per 100 parts by weight of the composition.

11. The solution type composition according to claim 8, which comprises 10 to 80 parts by weight of the hydrophilic solvent per 100 parts by weight of the composition.

12. The solution type composition according to claim 8, wherein the hydrophilic solvent is at least one selected from the group consisting of polyhydric alcohols, cellosolves and carbitols.

13. The solution type composition according to claim 8, which is a composition for ink jet printing.

* * * * *